Feb. 17, 1959  R. W. SAMSEL  2,873,604
APPARATUS FOR DETERMINING VIBRATION CHARACTERISTICS
Filed April 28, 1954  4 Sheets-Sheet 1

Inventor:
Richard W. Samsel,
by Charles W. Helzer
His Attorney.

Feb. 17, 1959 R. W. SAMSEL 2,873,604
APPARATUS FOR DETERMINING VIBRATION CHARACTERISTICS
Filed April 28, 1954 4 Sheets-Sheet 2
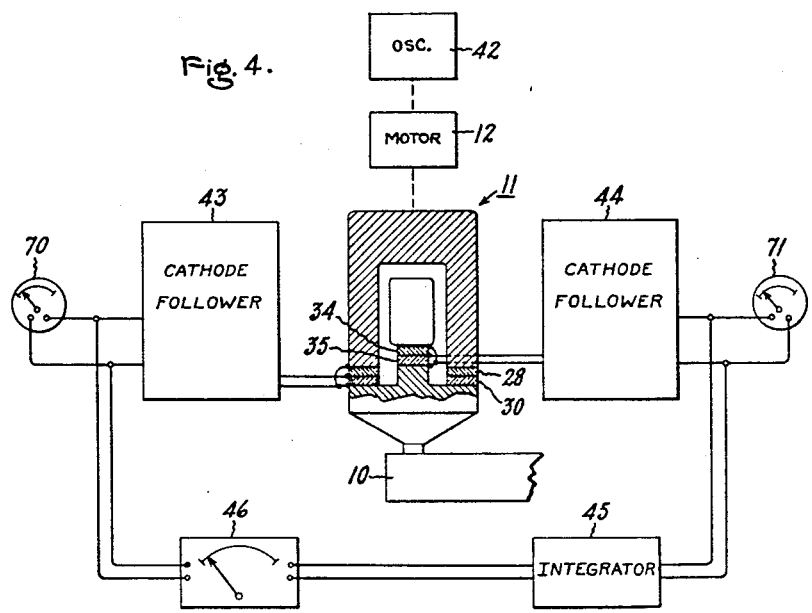
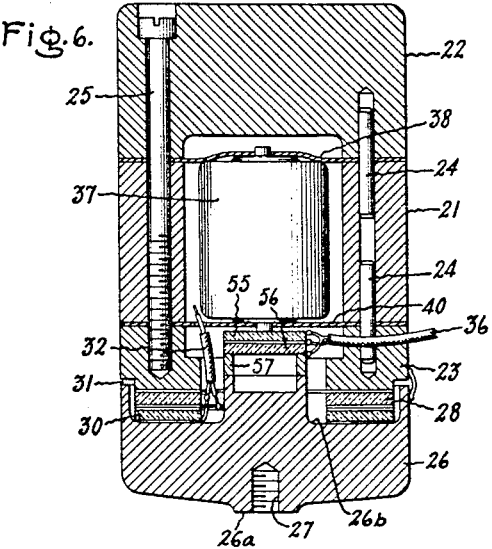
Inventor:
Richard W. Samsel,
by Charles W. Helzer
His Attorney.

Feb. 17, 1959 R. W. SAMSEL 2,873,604
APPARATUS FOR DETERMINING VIBRATION CHARACTERISTICS
Filed April 28, 1954 4 Sheets-Sheet 3
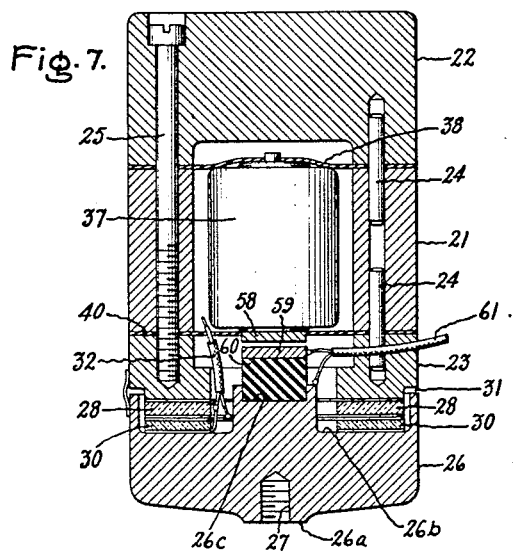
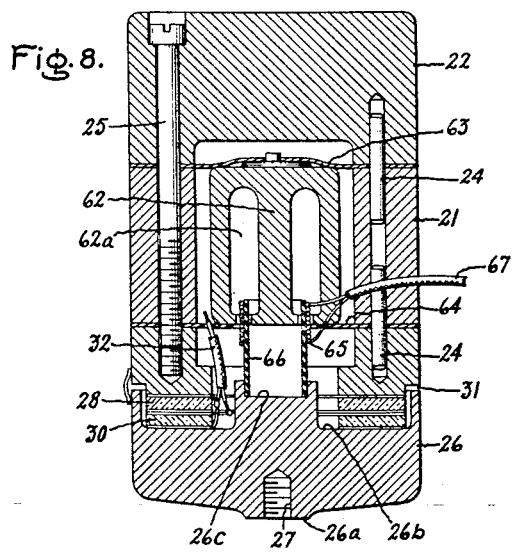
Inventor:
Richard W. Samsel,
by Charles W. Helzer
His Attorney.

Feb. 17, 1959   R. W. SAMSEL   2,873,604
APPARATUS FOR DETERMINING VIBRATION CHARACTERISTICS
Filed April 28, 1954   4 Sheets-Sheet 4

Inventor:
Richard W. Samsel,
by Charles W. Helzer
His Attorney.

United States Patent Office 2,873,604
Patented Feb. 17, 1959

2,873,604

APPARATUS FOR DETERMINING VIBRATION CHARACTERISTICS

Richard W. Samsel, Schenectady, N. Y., assignor to General Electric Company, a corporation of New York Application April 28, 1954, Serial No. 426,241

16 Claims. (Cl. 73—67.1)

This invention relates to apparatus for determining vibration characteristics of a system or object, and more particularly to apparatus for determining the mechanical mobility or impedance of a vibrating system or member.

Mechanical mobility may be defined as the movement of a vibratory system resulting from an impressed vibratory force, and the quantity may be expressed in terms of velocity per unit force. Of course, the mechanical mobility may vary as the frequency of the impressed vibratory force varies. This concept or its inverse, impedance, has been used for some years in the calculation of the response of vibratory systems, but the computation of the quantity quickly becomes difficult as the complexity of the system increases. Heretofore, instruments have not been available which were suitable or conveniently adaptable for experimentally determining vibration characteristics, such as mechanical mobility, or for experimentally measuring the quantities which are necessary in order to derive the mechanical mobility. Therefore, a primary object of the present invention is to provide novel apparatus for experimentally determining vibration characteristics, such as mechanical mobility, of a vibratory system, and to provide in that apparatus a novel measuring head from whose output signals mechanical mobility or impedance may be electrically derived or manually calculated.

Another object is to provide vibration characteristics measuring apparatus in which the phase angle between the force applied to a vibratory system and the resulting vibration of the system may be accurately determined.

Another object is to provide such apparatus which is usable throughout a wide frequency range.

Apparatus constructed in accordance with this invention for measuring vibration characteristics of a system or object may comprise a measuring head adapted to contact firmly the object under test, means for applying a vibratory force to the head, and associated electrical circuits and indicating means for utilizing the output of the head. The measuring head comprises a housing containing force sensitive and vibration sensitive means, with the force sensitive means so located that the vibratory force applied to the housing is transmitted through the force sensitive means to the object under test. Thus, the output of the force sensitive means is directly proportional to the force exerted on the test object, and the output of the vibration sensitive means is directly proportional to the vibration of the test object.

Suitable electrical means may be provided to convert the output of the vibration sensitive means into terms of velocity and to obtain the ratio of velocity to force. This ratio, which is the mechanical mobility of the object, may then be plotted as a function of frequency to obtain the mobility curve for the vibratory system. Alternatively, the vibration and force terms may be manually converted to other terms that may be plotted versus frequency on apropriate graph paper from which the mechanical mobility or impedance may be read. In addition, electrical means may be provided for determining the phase angle between the force applied to the test object and its resulting vibration.

For a better understanding of the invention, reference is made to the following description, taken in conjunction with the accompanying drawings, in which:

Fig. 4 is a diagrammatic view showing a complete apparatus for measuring the mechanical mobility of an object or system;

Figs. 5, 6, 7 and 8 are vertical sectional views similar to that of Fig. 3, but showing modified forms of the measuring head;

Figure 1:
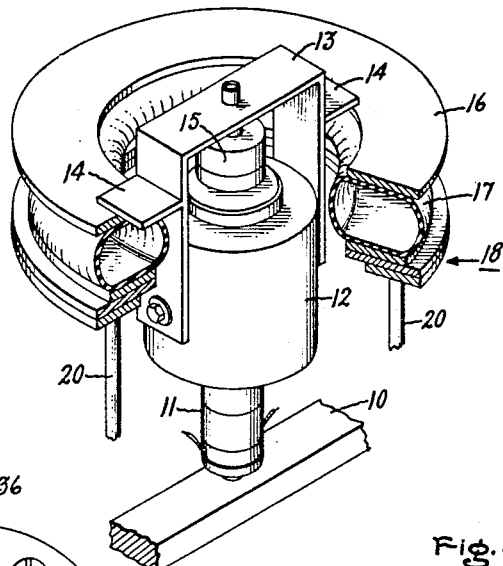
Fig. 1 is a perspective view of the mechanical portions of the apparatus of the invention, with portions broken away to show the construction clearly.

Referring now to Fig. 1, one form of the apparatus of the invention for determining the vibration characteristics of an object 10 comprises a vibration sensitive head 11, which firmly contacts the object 10, and a vibration motor 12 for imparting a vibratory force through the head 11 to the object 10.

The vibration motor 12 may be of any well-known type such as is available commercially, and the invention is not limited to the use of any particular type or motor. A motor that is known to be suitable for this use is the Model SD Vibration Motor manufactured commercially by the MB Manufacturing Co., Inc., but this example is given only as being illustrative of numerous suitable types. The selection of the vibration motor for use as the driver will necessarily be controlled by the application of the apparatus of the invention. The force exerted by the motor may vary from a fraction of a pound up to several thousand pounds, but it has been found that the force of ten pounds exerted by the motor referred to above is satisfactory for general purpose use. In order to be most useful, the vibration motor should be of the type whose frequency of vibration is variable, although in some instances a motor which operates at a single frequency may be acceptable. It is pointed out, however, that it is preferred that the vibratory force be of the sinusoidal type.

The vibration motor is supported for vibration isolation by suitable means, which, in this case, comprises an inverted U-shaped member 13 having a plurality of lugs 14 extending outwardly from its sides. The member 13 may be bolted to the casing of the motor 12 and a rubber pad 15 interposed between the motor and the end of the bracket 13. The motor is supported by the lugs 14, which rest on an annular plate 16 in contact with the upper surface of an inflated circular rubber tube 17. The inflated rubber tube 17 rests on a structure 18 comprised of a plurality of staggered annular plates, and is supported by suitable means such as the tripod legs 20. The tripod in turn rests on the earth or other solid vibrationless surface (not shown). Thus, the field of the vibration motor, which is fairly massive, is resiliently supported to provide a driver that reacts only against its own mass in its application of force to an object.

Figure 2:
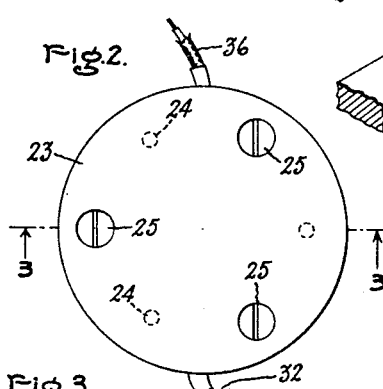
Fig. 2 is a plan view of one form of the measuring head of the invention.
Figure 3:
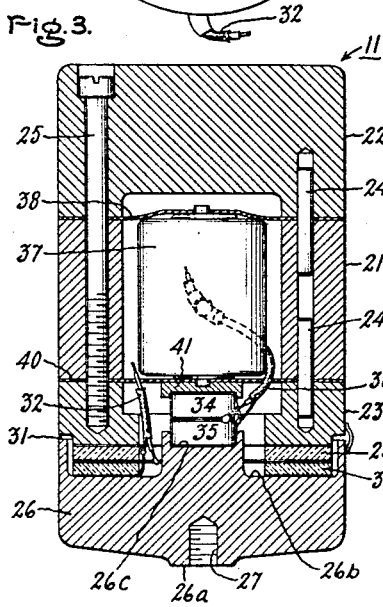
Fig. 3 is a vertical sectional view taken on the lines 3—3 of Fig. 2.

One form of measuring head 11, which is shown in Figs. 2 and 3, essentially comprises means for measuring the force exerted on the object by the vibration motor, and means for measuring the vibration of the object in response to the exerted force. Although mechanical mobility is defined as the movement of a system or object in response to an impressed vibratory force expressed in terms of velocity per unit force, it is not necessary to measure directly the velocity of the object. It is well known that the velocity is equal to the time rate of change of the displacement of the object and the acceleration is equal to the time rate of change of the velocity of the object. Here, it may validly be assumed that the velocity of the vibrating object, when plotted against time, is in the form of a sine wave, if the applied vibratory force is of the sinusoidal type. In this case, it can be shown by simple mathematics that $v = a/\omega = \omega X$, where $v$ is the velocity, $a$ is the acceleration, $X$ is the displacement, and $\omega$ is the frequency of vibration in radians per second. The displacement, velocity and acceleration may be expressed in terms of peak, average or R. M. S. values, and it is immaterial which values are used, so long as all quantities are expressed in the same terms. Thus, substituting the above expressions for velocity in the equation for mobility, it is found that $M = a/\omega F = \omega X/F$, where $F$ is the force exerted on the vibrating object. Therefore, it is apparent that if any one of the vibration defining quantities (displacement, velocity or acceleration) is known and the force exerted on the object at a particular frequency is known, the mobility of the object may be easily determined. Alternatively, it is possible to differentiate the displacement or to integrate the acceleration by means of electronic circuits and thus obtain the velocity, which may then be divided by the force in order to obtain the mobility.

The measuring head 11 shown in Figs. 2 and 3 comprises a housing having a closed end and and an open end, a base, and force sensitive and vibration sensitive means contained by the housing. The housing, which is constructed of a strong, light-weight metal, such as the type known commercially as Dural, comprises a hollow cylindrical midsection 21, a cap portion 22 that closes one end of the housing, and a lower hollow cylindrical section 23. The three sections of the housing may be aligned by dowel pins 24 that fit within suitably aligned bores, and the three sections may be secured together by bolts 25 threaded into the lower section 23. The lower end of the housing is covered by a base 26 that may be constructed of the same material as the housing, and that is provided with a shoulder 26a having a suitably threaded bore 27 therein to permit the measuring head to be securely attached to the object whose mobility is being measured. Of course, the base 26 may be maintained in contact with the object under test by other means, such as by straps or by manually pressing it thereagainst.

The base 26 has formed therein a wide circular groove 26b, and piezo-electric force sensitive means are mounted in this groove and adapted to be compressed between the lower section 23 of the housing and the base 26. In the preferred embodiment, the force sensitive means is of the piezoelectric type and comprises a pair of annular disks 28 and 30 of barium titanate ceramic, whose surfaces may be silver plated in the usual manner, and which are so polarized that the juncture between the two disks is positive and the outer surfaces of the pair are negative on compression. However, the invention is not limited to the use of piezoelectric elements for the force sensitive means, but also encompasses the use of other suitable means, such as a variable capacitance or variable inductance. The pair of annular barium titanate disks may be cemented together and held in place by having their outer surfaces cemented to the lower portion 23 of the housing and to the base 26. It is pointed out that the combined thickness of the annular disks 28 and 30 is such that a small air gap 31 is left between the walls of the lower portion 23 of the housing and the base 26, so that there is no actual contact between these two metal elements. Thus, a downward force exerted on the cap portion of the housing must be transmitted to the base through the barium titanate force sensitive elements 28 and 30.

A coaxial or shielded electrical lead 32 has its outer conductor connected to the negative upper and lower surfaces of the pair of barium titanate disks, and has its center conductor connected to the positive junction of the two disks. The lead 32 may be brought out of the housing through a suitable opening in the side of the midsection 21.

The vibration sensitive means included in the measuring head 11 may produce an output signal that is proportional either to displacement or acceleration depending on its mode of operation, as will be pointed out hereafter. The vibration sensitive means comprises piezoelectric elements, which, in the preferred embodiment, are a pair of barium titanate ceramic disks 34 and 35, whose surfaces may be silver plated in the usual manner, and which are so polarized that the juncture between the disks is positive and their outer surfaces are negative on compression. The inner surfaces of the disks 34 and 35 may be cemented together, and the disks cemented in a suitable depression 26c in the central portion of the base 26, with the disks 34 and 35 and the force sensitive annular disks 28 and 30 being substantially coaxial. The vibration sensitive means also includes a mass 37 mounted on the barium titanate disks by means of diaphragms 38 and 40 secured between the top portion 22 and the midportion 21 of the housing and between the midportion 21 and the lower portion 23 of the housing, respectively. The diaphragms 38 and 40, which may be constructed of Phosphor bronze, prevent movement of the mass 37 in lateral directions (as seen in the drawing), and permit the measuring head 11 to be mounted in any desired position. A spacer 41 is inserted between the diaphragm 40 and the top surface of the barium titanate disk 34, and, in the present case, where the outer surfaces of the barium titanate disks 34 and 35 are negative, the spacer 41 may be made of a conducting material.

In operation, vibratory force is supplied to the cap portion 22 of the housing of the measuring head 11 by the vibration motor 12 (Fig. 1), and is transmitted through the annular barium titanate disks 28 and 30 to the object 10 secured to the base 26. The vibratory force transmitted through the barium titanate disks 28 and 30 causes them to produce an electrical signal whose amplitude is directly proportional to the force exerted. As the object 10 vibrates in response to the applied force, the inertia of the mass 37 causes it to exert force on the barium titanate disks 34 and 35 that form part of the vibration sensitive means, and these disks also produce an electrical signal. If the measuring head is operated in the frequency range below the natural resonant frequency of the vibration sensitive means (including the mass 37), the electrical output signal from the vibration sensitive means is directly proportional to the acceleration of the measuring head and the test object. On the other hand, if the head is operated in the frequency range above its resonant frequency the output signal is directly proportional to the displacement of the head and test object. The book "Vibration Problems in Engineering" by Timoshenko (Van Nostrand, 1937) discusses this phenomenon in more detail. It has been found that the vibration sensitive means must be located quite close to the force sensitive means to avoid serious error in the measured values, and, although other arrangements may be satisfactory, the coaxial or concentric arrangement of disks shown herein is preferred.

In the particular embodiment of the measuring head illustrated in Fig. 3, the mass 37 approximately is 0.3 pound. The diaphragms 38 and 40 are pretensioned to preload the disks 35 and 34 with a force exceeding three pounds, thus permitting accelerations exceeding ten times the acceleration of gravity (10 g) or 10 times approximately 386 inches per second. The natural resonant frequency of the system is about 5,500 cycles per second, thus giving a useful frequency range below resonance of approximately 3,500 cycles per second, which can be increased to 10,000 cycles per second by decreasing the mass from 0.3 pound to 0.03 pound. The reduction in mass somewhat reduces the sensitivity of the vibration sensitive means, but at higher frequencies the reduced sensitivity is still satisfactory. The sensitivity curve of the vibration sensitive means, using a mass of approximately 0.3 pound, is essentially flat from 10 cycles per second to approximately 3,500 cycles per second, and the sensitivity curve of the force measuring means is essentially flat throughout the entire range from 10 to 10,000 cycles per second. Thus, it is apparent that the limiting factor so far as the useable frequency range below resonance is concerned is the vibration sensitive means, and it is possible to extend its range up to 10,000 cycles per second or more without undue difficulty.

As previously mentioned, it is possible to operate in the frequency range above the resonant frequency of the vibration sensitive means, in which case the output of the barium titanate disks is proportional to the displacement of the vibrating object rather than proportional to its acceleration. However, it is pointed out that when the disks are fairly heavy the resonant frequency of the vibration sensitive means is rather high, and, if an attempt is made to work in the range above this frequency, difficulty may be encountered with resonances of other parts.

Referring now to Fig. 4, which diagrammatically shows a complete system for measuring the mechanical mobility of an object, it is seen that alternating current power is supplied to the vibration motor 12 by an oscillator 42. The oscillator 42 may be of any conventional well-known type, in which the frequency of the output is variable over the range to which the vibration motor is responsive and over which the vibration characteristics of the object are to be determined. As previously explained, the vibration motor applies sinusoidal vibratory force to the measuring head 11, which is transmitted through the piezoelectric force sensitive elements to the object 10 under test, thus causing an electrical signal output from the force sensitive elements. As the object 10 vibrates in response to the force supplied thereto, it causes an output from the piezoelectric vibration sensitive means contained within the housing of the measuring head. Because both the force sensitive means and the vibration sensitive means of the measuring head shown in Fig. 3 comprise high impedance barium titanate elements, the output signals from both of these means should be fed into circuits that have high impedance inputs. In the present case, the output of the annular disks 28 and 30 is connected to the input of a conventional cathode follower 43, and the output of the disks 34 and 35 is connected to the input of a similar cathode follower 44. It is pointed out that when using force sensitive and vibration sensitive means that appear capacitive, such as piezoelectric elements, the use of input resistors in the cathode followers will result in differentiating the output signals of the piezoelectric means. For the present, it is assumed that there are no input resistors, so that the output of the cathode follower 43 is an electrical signal that is directly proportional to the force exerted on the object 10 by the vibration motor 12, and the output of the cathode follower 44 is an electrical signal that is directly proportional to the acceleration or displacement of the object under test.

If the measuring head is operating in a mode such that the output signal from the vibration sensitive means is proportional to acceleration, the output of the cathode follower 44 may be connected to the input of a conventional electronic integrating circuit 45, such as is well-known in the art, which operates to convert the acceleration proportional signal to a velocity proportional signal. The velocity proportional output signal of the integrating circuit 45 may be connected to one input of a conventional ratio meter 46, and the force proportional output signal of the cathode follower 43 may be connected to the second input of the meter 46. Thus, the reading of the ratio meter 46 will be equal to the velocity of the test object divided by the force applied to the object, which, by definition, is the mechanical mobility of the object. The ratio meter may be one of the types described in an article entitled "Ratio meter measures reflection coefficient" by Rosenthal, Potter and Badoyannis, published in Electronics, November 1952, pp. 136–139, or other commercially available type. It is apparent, of course, that mechanical impedance, which is defined as the inverse of mechanical mobility, may be measured by reversing the leads to ratio meter 46 so that the meter indicates the ratio of force to velocity rather than velocity to force.

If the measuring head shown in Fig. 3 (or one of the forms of measuring head to be described hereafter) is operated in a mode such that its output signal is proportional to displacement, the integrating circuit 45 may be replaced by a conventional electronic differentiating circuit. It is well-known that velocity is equal to the time rate of change of displacement. Therefore, the differentiating circuit will operate to convert the displacement proportional output signal of the measuring head to a velocity proportional signal, which may be utilized by the ratio meter 46 as described above. Alternatively, the differentiating circuit may be eliminated and the cathode follower 44 provided with an input resistor to differentiate the displacement signal, as previously mentioned.

In some applications, it may be desirable to know the phase angle between the applied force and the resulting velocity of the object, in addition to knowing the mobility of the object at various frequencies. In this case, a conventional phase meter may be connected in parallel with ratio meter 46, or, alternatively, a single instrument may be employed to indicate both phase angle and ratio of velocity to force. A suitable meter of the latter type is manufactured commercially by the Technology Instrument Corporation, Waltham, Mass., and is known as the Type 301-A Z-Angle Meter.

Figure 5:
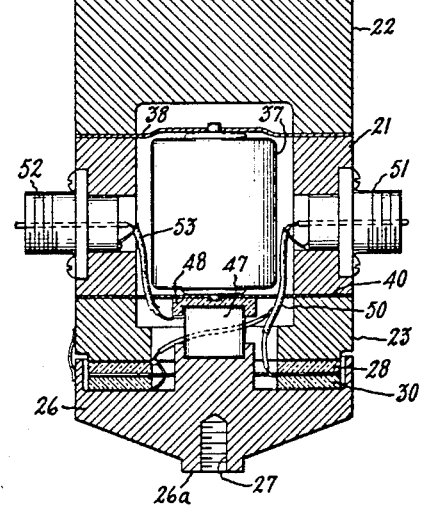

A form of measuring head is shown in Fig. 5, which differs from that shown in Fig. 3 in several respects. First, the vibration sensitive means comprises a single barium titanate disk 47 rather than a pair of disks as in the embodiment first described. In this case, the barium titanate disk 47, whose flat surfaces may be silver plated in the usual manner, is so polarized that its upper surface is positive, while its lower surface is negative. Therefore, it is necessary to insulate its upper surface from the housing, and this is done by inserting an insulating spacer 48 between the disk and the diaphragm 40. It is also apparent that the force sensitive means may comprise a single barium titanate disk rather than two disks, if suitable means are provided to insulate the single disk from either the housing or the base. Second, the electrical leads from the force sensitive and vibration sensitive elements are not brought out of the head through openings, but rather are joined to standard forms of connectors mounted in suitable openings in the wall of the center portion 22 of the housing. In this embodiment, an electrical lead 50 connects the annular barium titanate disks 28 and 30 to a connector 51, with the center conductor of the lead being connected to the positive juncture of the barium titanate disks, and with the outer conductor connected to the outer surfaces of the disks and grounded to the housing. The electrical connection between the vibration sensitive barium titanate disk 47 and a connector 52 consists of a lead 53, whose inner conductor is attached to the positive upper surface of the barium titanate disk 47 and whose outer conductor is grounded to the housing. The remainder of the construction and the operation of the measuring head shown in Fig. 5 is like that previously described with reference to Fig. 3.

Figs. 6, 7 and 8 illustrate other modified forms of measuring heads that are suitable for use in the system shown in Fig. 4. Referring now to Fig. 6, it is seen that the measuring head there shown is generally similar to that shown in Fig. 3, but differs therefrom in the vibration sensitive means included in the head. The remainder of the measuring head, including the force sensitive means, is similar to that previously described with reference to Fig. 3, and hence will not be again described in detail. As to the vibration sensitive means, the heavy barium titanate disks 34 and 35 shown in Fig. 3 have been replaced by relatively thin barium titanate disks 55 and 56, polarized in the same manner as the disks 34 and 35. The thin disks 55 and 56 are supported across a cylindrical member 57 secured to the central portion of the base 26, and act as a spring to support the mass 37, with additional support for the mass being provided by the diaphragms 38 and 40. By varying the stiffness of the spring (that is, the stiffness of the diaphragms or the thickness of the barium titanate disks 55 and 56), the natural resonant frequency of the vibration sensitive portion of the head may be varied, and, if the disks and diaphragms are made sufficiently weak, the resonant frequency may be reduced to a point below the range of frequencies over which it is desired to operate the head. In this case, the electrical output signal of the barium titanate disks 55 and 56 will be proportional to the displacement of the vibrating object to which the head is secured, and the displacement signal may be utilized in the manner previously described or in the modified system to be described hereafter.

The measuring head shown in Fig. 6 may also be made to operate in the same manner as that shown in Fig. 3 by increasing the thickness of the barium titanate disks to a point where the resonant frequency of the vibration sensitive means is above the range of frequencies over which the head is to operate. In that mode of operation, the output signal of the head is proportional to the acceleration of the object under test and the head may be used in the system illustrated in Fig. 4.

Fig. 7 illustrates a measuring head in which the vibration sensitive means is of the capacitive type. In this embodiment, the mass 37 is mounted in the housing by means of the diaphragms 38 and 40 in the same manner as in the head shown in Figs. 3 and 4. Here, however, an electrode 58 mounted on the bottom of and electrically connected to the mass 37 serves as one element of a capacitor, the remainder of which comprises another electrode 59 spaced from the mass 37 and mounted on an insulating block 60 which is secured in the depression 26c in the center of the base. The electrical connection to the vibration sensitive means comprises a lead 61 having one conductor connected to the electrode 59 and the other conductor grounded to the housing. The remainder of the head is like that previously described with reference to Fig. 3.

In operation, as the measuring head vibrates with the object under test, the width of the air gap between the electrodes 58 and 59 varies, thus causing a change in the capacitance of the circuit. If the diaphragms 38 and 40 are so chosen that the resonant frequency of the mass and diaphragms is above the range of frequencies over which it is desired to measure the vibration characteristics of the test object, the capacitance between the electrodes will be directly proportional to the acceleration of the test object. Of course, it is apparent that a bias voltage or charge must be applied to the variable capacitance in order to produce an output signal. If the cathode follower 44 is provided with a capacitor thereacross to prevent differentiation of the acceleration proportional signals, the measuring head shown in Fig. 7 may be employed in the system shown in Fig. 4 in the same manner as the measuring head shown in Fig. 3. Alternatively, at frequencies above the resonant frequency of the mass and diaphragms, the capacitance between the mass and the electrode is a direct measure of the displacement of the vibrating body under test. In this case, if the cathode follower 44 to which the output of the measuring head is connected does not have a capacitance thereacross and presents an essentially resistive impedance less than the combined capacitive reactance of the variable capacitance and its electrical lead, the cathode follower will act to differentiate the displacement output signal. Thus, the output of the cathode follower 44 will be a signal that is proportional to the velocity of the test object. Of course, if the system is operated in this manner, the integrating circuit 45 may be eliminated and the outputs of the cathode followers may be connected directly to the indicating meter.

Fig. 8 illustrates still another form of measuring head in which the vibration sensitive means are electromagnetic in character. In this case, such means comprise a permanent magnet 62 mounted by means of diaphragms 63 and 64 secured between the top portion 22 and the midportion 21 of the housing and between the midportion 21 and the portion 23 of the housing, respectively. The upper diaphragm 63 is like diaphragm 38 (Figs. 3, 4, 6 and 7), but the lower diaphragm 64 is annular in shape and supports the magnet 62 only about its periphery. The magnet 55 is provided with a circular slot 62a, which defines opposite poles at the lower end of the magnet (as seen in the drawing), and a coil 65 wound on a conventional circular form 66 mounted in the depression 26c in the center of the base 26 extends upwardly into the slot 62 between the poles of the magnet. The ends of the coil are connected to the two conductors of a lead 67 that is brought out through an opening in the housing. Of course, one end of the coil 65 and one of the conductors of lead 67 may be grounded to the housing, if desired.

In operation, the measuring head vibrates with the object under test, and the permanent magnet 62 vibrates therewith in the manner of the mass 37 previously described. As the magnet moves relative to the coil 65, the movement of the lines of magnetic flux extending from pole to pole across the slot 62a and through the turns of the coil causes a voltage to be induced in the coil.

The measuring head shown in Fig. 8 has an advantage in that, when the diaphragms 63 and 64 act as weak springs and the resonant frequency of the magnet and diaphragms is low, the voltage induced in the coil 65 is directly proportional to the velocity of the object under test to which the measuring head is attached. Thus, when the measuring head of Fig. 8 is operated in this mode in the complete system shown in Fig. 4, the integrating circuit 45 may be eliminated and the outputs of the cathode followers 43 and 44 connected directly to the input of the indicator. It is pointed out that if the measuring head is operated at a frequency below its resonant frequency, the output of the coil 65 will be proportional to the second derivative of velocity, which is a quantity known as "jerk."

As previously stated, the mechanical mobility M of a sinusoidally vibrating system is defined $$M = \frac{v}{F} = \frac{a}{\omega F} = \frac{\omega X}{F}$$

where $v$ is velocity, $a$ is acceleration, X is displacement, $\omega$ is the frequency of vibration in radians per second, and F is the vibratory force exerted on the object. Thus, if the force and frequency, and either the displacement, velocity or acceleration are known, it is a simple matter to compute the mechanical mobility of the object, which may then be plotted against frequency to obtain the usual mobility curve. If it is desired to operate in this manner, the system shown in Fig. 4 may be modified to eliminate the integrating or differentiating circuits and the ratio meter 46. In this form of the apparatus, the output of the cathode follower 43, which is proportional to the vibratory force exerted on the object, may be connected to a voltmeter 70, and the output of cathode follower 44, which is proportional to the displacement, velocity or acceleration of the object depending on the measuring head used and its mode of operation, may be connected to a voltmeter 71. The voltmeters 70 and 71 may be calibrated directly in terms of force and displacement, velocity or acceleration, respectively, or the voltage readings may be converted to these terms by the use of appropriate calibration curves.

In some instances, it may be necessary only to know the phase angle between the applied force and the resulting displacement, velocity or acceleration, because the frequencies of the points of resonance and anti-resonance are related to the phase angle. It is known that at both the maxima and minima of the mobility curve (points of resonance and anti-resonance), there is zero phase angle between the force and velocity, and there is a 90° phase angle between the force and acceleration and between the force and displacement. Therefore, if this information is sufficient, it may be obtained simply by connecting a conventional phase meter to the output of the cathode followers 43 and 44 shown in Fig. 4. Thus, when the phase meter shows the proper phase difference between the force and vibration signals, the mobility curve will be at a maximum or a minimum point. In other applications, it may be desirable to know the phase angle between the force and the resulting vibration of the object, in addition to knowing the mobility of the object at various frequency. In this case, the phase meter may be connected to the outputs of the cathode followers along with the voltmeters 70 and 71.

Figure 9:
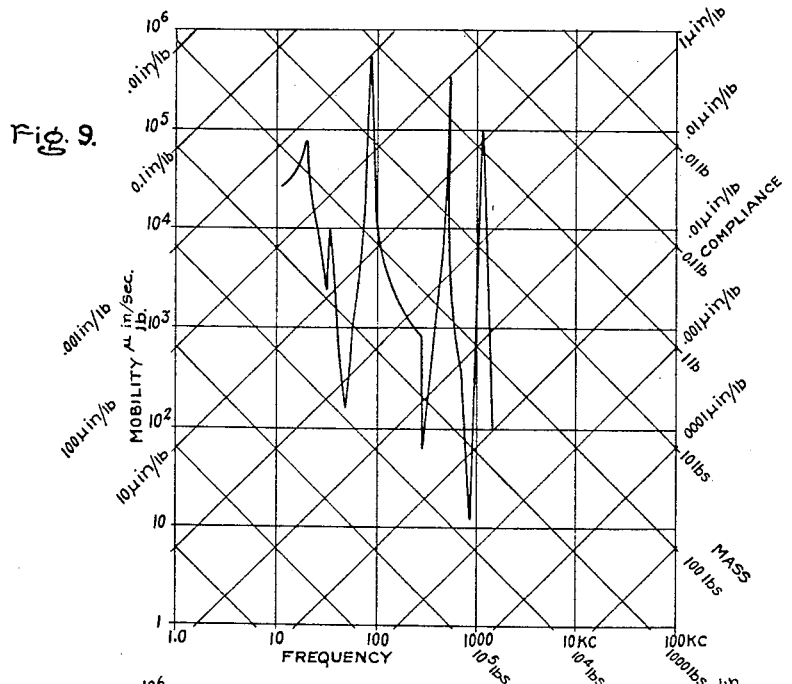
Fig. 9 is a diagram of the measured mechanical mobility of a steel bar.
Figure 10:
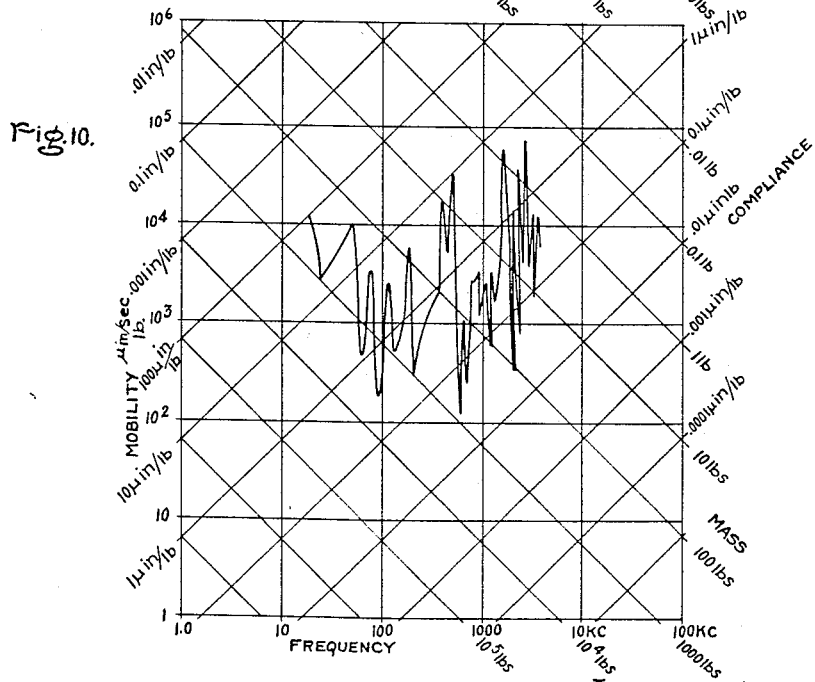
Fig. 10 is a diagram similar to Fig. 9 showing the measured mechanical mobility of a cast-iron base plate.

As is well-known, the force exerted on an object is equal to the mass of the object multiplied by the acceleration of the object ($F=ma$). If this expression is substituted into the equation for mobility M, it is seen that $$M = \frac{1}{\omega m}$$

where $m$ is the mass of the object, and $\omega$ is the frequency of vibration in radians per second. If one of the measuring heads shown in Figs. 3, 5, 6 and 7 is operating in a frequency range below its natural frequency, the acceleration may be read from voltmeter 71, and manually divided by the force exerted, which may be read from voltmeter 70, to find the mass. The mass may be plotted against frequency on suitable graph paper from which the mobility may be read directly. Thus, one step in the calculation of mobility is eliminated; that is, it is not necessary to take into account the frequency when making the calculations. Figs. 9 and 10 illustrate one form of graph paper which is suitable for this purpose. It is seen that the abscissa of the graph is the log of frequency, the ordinate is the log of mobility, and the mass is represented by sloping lines running downwardly from left to right. Thus, if the mass of the object is calculated at a particular frequency, it is necessary only to plot mass against frequency, and the mobility may be read directly from the chart; that is, the chart is so constructed that it multiplies the mass by the frequency in radians per second and takes the reciprocal of the product.

It was previously pointed out that the mobility M of the test object may be expressed in terms of the displacement X of the object, in which case $M=\omega X/F$. The quantity $(X/F)$ is defined as compliance. Thus, if one of the measuring heads shown in Figs. 3, 5, 6 and 7 is operating at frequencies above its natural frequency, the force F and displacement X may be read from voltmeters 70 and 71, respectively, and the compliance calculated manually. This quantity may then be plotted against frequency on the graph paper shown in Figs. 9 and 10 to obtain the mobility.

In order to recapitulate briefly, the various measuring heads, the types of vibration sensitive means and their outputs are shown in the following table:

| Measuring head | Vibration sensitive means | Output of vibration sensitive means | |
|---|---|---|---|
| | | Below resonance | Above resonance |
| Fig. 3 | Piezoelectric | Acceleration | Displacement. |
| Fig. 5 | ....do.... | ....do.... | Do. |
| Fig. 6 | ....do.... | ....do.... | Do. |
| Fig. 7 | Capacitive | ....do.... | Do. |
| Fig. 8 | Inductive | "Jerk" | Velocity. |

Fig. 9 illustrates the measured mobility of a steel bar 48 inches long, two inches wide, and one inch thick. The bar was mounted on soft sponge rubber approximately at the middle points of the first free-free resonance (meaning unsupported at its ends), and the mobility was measured at the midpoint. As a check on the accuracy of the experimental measurements, the frequencies of the normal modes of resonance and anti-resonance were calculated by conventional methods. The following table shows the correspondence between the measured and calculated points:

| | Calculated frequencies (C. P. S.) | Measured frequencies (C. P. S.) |
|---|---|---|
| Free-free symmetrical beam resonances | 91 | 91 |
| | 492 | 475 |
| | 1,210 | 1,160 |
| Anti-resonances | 57 | 55 |
| | 358 | 320 |
| | 1,000 | 900 |

It is noted that none of the measured resonant or anti-resonant frequencies differs from the calculated value by more than 10 percent, and for the most part they differ by much less than 10 percent. The resonance exhibited at 18 C. P. S. is that of the beam as a rigid body on the sponge rubber supports, and the one exhibited at 33.5 C. P. S. is that of rocking motion on the same supports. The frequencies of these points were not calculated.

The apparatus of the invention is of greatest importance, of course, in those situations where the response of the vibratory system is so extremely complex that it is quite difficult or impossible to calculate. Such an example is shown in Fig. 10, which illustrates the measured mobility of a cast iron base plate, weighing 60 pounds, and having various unsymmetrical ribs. The casting was supported on sponge rubber blocks on a concrete floor, which rested on the ground. The mobility of such a complex vibratory system is virtually impossible to calculate, but it is easily seen from the measured mobility curve just where resonances and anti-resonances appear. This information, of course, is exceedingly useful and ofttimes indispensable in the design of industrial machinery.

It is well-known that a force exerted at a point on an object, such as the vibratory force applied to the test object through the measuring head, may be resolved into three components acting at right angles to each other. The applied force may also be considered to include three components of torque acting on the object, and, of course, there are three components of linear vibration and three components of angular vibration in response to each of the force and torque components, a total of thirty-six components in all. The force sensitive means of the measuring head may be rearranged and adapted to measure any of the components desired, as is apparent to one skilled in the art.

It is now apparent that the present invention provides a convenient practical apparatus for the experimental determination of vibration characteristics. The apparatus may be sturdily constructed at reasonable cost, and its accuracy is well within the practical limits required. In addition, the apparatus is relatively small, a typical measuring head being only two inches in diameter, four inches high and weighing slightly over one pound, and the entire apparatus may be conveniently transported from place to place.

It is apparent that various changes and modifications may be made in the apparatus by one skilled in the art without departing from the spirit of the invention, and it is intended to be limited only by the scope of the appended claims.

What I claim as new and desire to secure by Letters Patent of the United States is:

1. In apparatus for determining vibration characteristics of an object, the combination of a housing, a base mounted at one end of said housing in contact with said object, means disposed at the other end of said housing for applying a vibratory force, annular piezoelectric force sensitive means interposed between said housing and said base for providing an electrical signal proportional to the vibratory force applied to said object, vibration sensitive means mounted centrally on said base within said housing for providing an electrical signal proportional to the vibration of said object in response to said vibratory force, said vibration sensitive means including piezoelectric means disposed substantially in lateral alignment and coaxial with respect to said force sensitive means with a resiliently mounted inertia mass supported thereon, circuit means connected to said piezoelectric means for providing a signal proportional to the velocity of said object in response to said vibration proportional signal, and means connected to said circuit means and said annular piezoelectric force sensitive means for indicating the ratio of signals therefrom.

2. In apparatus for determining vibration characteristics of an object, the combination of a housing, a base mounted at one end of said housing in contact with said object, means disposed at the other end of said housing for applying a vibratory force, annular force sensitive means interposed between said housing and said base for providing an electrical signal proportional to the vibratory force applied to said object, vibration sensitive means disposed within said housing comprising coil means centrally mounted on said base substantially in lateral alignment with respect to said force sensitive means and magnetic inertia mass means resiliently mounted in said housing in flux linking relationship with said coil means for inducing therein an electrical signal proportional to the vibration of said object in response to said vibratory force, circuit means connected to said coil means for providing a signal proportional to the velocity of said object in response to said vibration proportional signal, and means connected to said circuit means and said annular force sensitive means for indicating the ratio of the signals.

3. In apparatus for determining vibration characteristics of an object, a vibration sensitive head adapted to transmit vibratory force to the object, said head comprising annular force sensing piezoelectric means for developing an electrical signal proportional to said vibratory force and means coupled to said object and including vibration sensitive means disposed centrally and substantially in lateral alignment with respect to said annular force sensing means for obtaining an electrical signal proportional to the vibration of said object in response to said vibratory force with inertia means resiliently mounted on said vibration sensitive means.

4. In apparatus for determining vibration characteristics of an object, a vibration sensitive head adapted to transmit vibratory force to the object, said head comprising a housing, a base mounted at one end of said housing in contact with said object, annular piezoelectric force sensitive means interposed between said housing and said base for providing an electrical signal proportional to the force exerted on said object, and vibration sensitive means mounted centrally on said base and disposed substantially in lateral alignment with respect to said annular piezoelectric force sensitive means for providing an electrical signal proportional to the vibration of said object in response to said vibratory force with inertia means resiliently mounted on said vibration sensitive means.

5. In apparatus for determining vibration characteristics of an object, a vibration sensitive head adapted to transmit vibratory force to said object, said head comprising a housing having a closed end and an open end, a base mounted at the open end of said housing in contact with said object, annular piezoelectric force sensitive means interposed between said housing and said base for providing an electrical signal proportional to said vibratory force, and vibration sensitive means mounted centrally on said base within said housing and including piezoelectric means disposed substantially in lateral alignment and coaxial with respect to said annular piezoelectric force sensitive means for providing an electrical signal proportional to the vibration of said object in response to said vibratory force with inertia means resiliently mounted on said piezoelectric means.

6. In apparatus for determining vibration characteristics of an object, a vibration sensitive head adapted to transmit vibratory force to said object, said head comprising a housing having a closed end and an open end, a base mounted at the open end of said housing in contact with said object, force sensitive means interposed annularly between said housing and said base for providing an electrical signal proportional to said vibratory force, and vibration sensitive means mounted centrally on said base within said housing and including piezoelectric means disposed substantially in lateral alignment and coaxial relationship to said force sensitive means for providing an electrical signal proportional to the vibration of said object in response to said vibratory force with inertia means resiliently mounted on said piezoelectric means.

7. In apparatus for determining vibration characteristics of an object, a vibration sensitive head adapted to transmit vibratory force to said object, said head comprising a housing having a closed end and an open end, a base mounted at the open end of said housing in contact with said object, annular piezoelectric force sensitive means interposed between said housing and said base for providing an electrical signal proportional to said vibratory force, and vibration sensitive means mounted centrally on said base within said housing for providing an electrical signal proportional to the vibration of said object in response to said vibratory force, said vibration sensitive means including piezoelectric means substantially in lateral alignment and coaxial with respect to said annular force sensitive means and a mass mounted on said piezoelectric means for axial movement in said housing in response to vibration of said object.

8. In apparatus for determining vibration characteristics of an object, a vibration sensitive head adapted to transmit vibratory force to said object, said head comprising a housing having a closed end and an open end, a base mounted at the open end of said housing in contact with said object, force sensitive means interposed annularly between said housing and said base for providing an electrical signal proportional to said vibratory force, and vibration sensitive means mounted centrally on said base within said housing and including variable capacitance means substantially in lateral alignment and coaxial relationship to said force sensitive means for providing an electrical signal proportional to the vibration of said object in response to said vibratory force with inertia means resiliently mounted in said housing and having one plate of said capacitance means mounted thereon for movement with respect to a fixed plate coupled to said base.

9. In apparatus for determining vibration characteristics of an object, a vibration sensitive head adapted to transmit vibratory force to said object, said head comprising a housing having a closed end and an open end, a base mounted at the open end of said housing in contact with said object, force sensitive means interposed annularly between said housing and said base for providing an electrical signal proportional to said vibratory force, vibration sensitive means mounted centrally on said base within said housing and comprising coil means disposed substantially in lateral alignment and coaxially located with respect to said force sensitive means and magnetic inertia means resiliently mounted in said housing in flux linking relationship with said coil means for inducing therein an electrical signal proportional to the vibration of said object in response to said vibratory force.

10. In apparatus for determining the vibration characteristics of an object, the combination of means for producing vibratory force, means through which said force is applied to said object including annularly disposed force sensing means for obtaining an electrical signal proportional to said vibratory force, means for obtaining an electrical signal proportional to the velocity of said object in response to said applied force including vibration sensing means mechanically coupled to said object and positioned substantially in lateral alignment and coaxial with respect to said force sensing means with inertia means coupled thereto for movement in response to vibration of said object to alter the condition of said vibration sensing means and produce said signal, and means responsive to said velocity proportional electrical signal and said force proportional electrical signal for obtaining the ratio thereof.

11. In apparatus for determining vibration characteristics of an object, the combination comprising a housing, a base mounted at one end of said housing and disposed in contact with said object, vibrator means coupled to the other end of said housing, force sensitive means mounted annularly between said housing and said base for providing an electrical signal proportional to force applied to said object by said vibrator means, vibration sensitive means mounted centrally on said base within said housing and including signal generating means substantially in lateral alignment with said force sensitive means for providing an electrical signal proportional to vibration of said object, circuit means connected to said signal generating means for producing an electrical signal proportional to the velocity of said object in response to said signal porportional to vibration, and means connected to said circuit means and said force sensitive means for indicating the ratio of the signals therefrom.

12. In apparatus for determining vibration characteristics of an object, the combination of a housing, a base mounted at one end of said housing as a cover and in contact with said object, means disposed at the other end of said housing for applying a vibratory force, annular piezoelectric force sensitive means interposed between said housing and said base for providing an electrical signal proportional to the vibratory force applied to said object, vibration sensitive means mounted on said base within housing and disposed substantially in lateral alignment and coaxial relationship to said annular piezoelectric force sensitive means for providing an electrical signal proportional to the vibration of said object in response to said vibratory force, a resiliently mounted inertia mass supported in said housing on said vibration sensitive means, circuit means connected to said vibration sensitive means for providing a signal proportional to the velocity of said object, and means connected to said ciruit means and said fore sensitive means for indicating the ratio of the signals.

13. In apparatus for determining vibration characteristics of an object, the combination of a housing, a base mounted at one end of said housing in contact with said object, means disposed at the other end of said housing for applying a vibratory force, annular force sensitive means interposed between said housing and said base for providing an electrical signal proportional to the vibratory force applied to said object, vibration sensitive means mounted centrally on said base within said housing and including piezoelectric means disposed substantially in lateral alignment and coaxial relationship to said force sensitive means for providing an electrical signal proportional to the vibration of said object in response to said vibratory force with a resiliently mounted inertia mass supported in said housing on said piezoelectric means, circuit means connected to said piezoelectric means for providing a signal proportional to the velocity of said object in response to said vibration proportional signal, and means connected to said circuit means and said annular force sensitive means for indicating the ratio of the two signals.

14. In apparatus for determining vibration characteristics of an object, the combination of a housing, a base mounted at one end of said housing in contact with said object, means disposed at the other end of said housing for applying a vibratory force, annular force sensitive means interposed between said housing and said base for providing an electrical signal proportional to the vibratory force applied to said object, vibration sensitive means mounted centrally on said base within said housing and including variable capacitance means disposed substantially in lateral alignment and coaxial relationship to said force sensitive means for providing an electrical signal proportional to the vibration of said object in response to said vibratory force with a resiliently mounted inertia mass having one plate of said capacitance means attached thereto for movement with respect to a fixed plate supported on said base, circuit means connected to said variable capacitance means for providing a signal proportional to the velocity of said object in response to said vibration proportional signal, and means connected to said circuit means and said annular force sensitive means for indicating the ratio of the signals.

15. In apparatus for determining vibration characteristics of an object, the combination of a housing having a closed end and an open end, a base mounted at the open end of said housing in contact with said object, means disposed at the closed end of said housing for applying a vibratory force, annular piezoelectric force sensitive means interposed between said housing and said base for providing an electrical signal proportional to the force exerted on said object, and vibration sensitive means for providing an electrical signal proportional to the vibration of said object in response to said vibratory force, said vibration sensitive means mounted centrally on said base substantially in lateral alignment with said annular piezoelectric force sensitive means with inertia means resiliently mounted in said housing for axial movement and supported on said vibration sensitive means.

16. In apparatus for determining the mechanical mobility of an object, the combination comprising a housing having a base in contact with said object, means disposed in contact with said housing for applying a vibratory force, annular force sensitive means disposed between said housing and said base for producing signals proportional to said vibratory force, vibration sensitive means mounted centrally on said base within said housing substantially in lateral alignment with said annular force sensitive means for producing signals proportional to vibrations of said object, a resiliently mounted mass disposed within said housing and supported by said vibration sensitive means for axial movement in response to vibrations of said object, circuit means connected to said vibration sensitive means for developing signals proportional to velocity of said object in response to signals therefrom, and means connected to said circuit means and to said force sensitive means for indicating the ratio of the signals.

(References on following page)

References Cited in the file of this patent

UNITED STATES PATENTS

| | | |
|---|---|---|
| 1,880,425 | Flanders | Oct. 4, 1932 |
| 2,272,984 | Ritzmann | Feb. 10, 1942 |
| 2,403,999 | Read et al. | July 16, 1946 |
| 2,411,401 | Welch | Nov. 19, 1946 |
| 2,412,240 | Williams et al. | Dec. 10, 1946 |
| 2,661,622 | Severs | Dec. 8, 1953 |

FOREIGN PATENTS

| | | |
|---|---|---|
| 316,407 | Great Britain | Aug. 1, 1929 |